Dec. 18, 1962 D. F. COLLINS ET AL 3,069,187
COUPLING FOR TUBES
Filed June 12, 1959
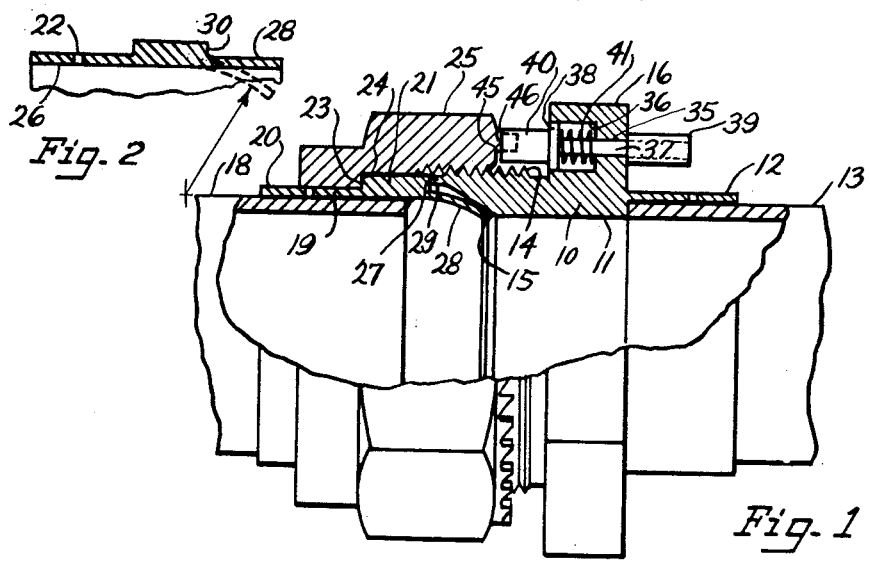
Fig. 2
Fig. 1
Fig. 3
Fig. 4
Fig. 5
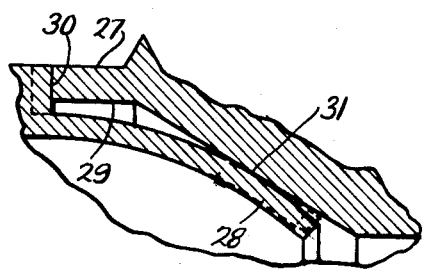
Fig. 6
INVENTORS
DONALD F. COLLINS &
BY DONALD E. EMMONS
John N. Wolfram
ATTORNEY

United States Patent Office 3,069,187
Patented Dec. 18, 1962

3,069,187
COUPLING FOR TUBES
Donald F. Collins, Gardena, and Donald E. Emmons, Inglewood, Calif., assignors to Parker-Hannifin Corporation, Cleveland, Ohio, a corporation of Ohio
Filed June 12, 1959, Ser. No. 820,033
3 Claims. (Cl. 285—110)

This invention relates to couplings for tubes and more particularly to couplings in which the parts engage in metal-to-metal sealing contact.

It is an object of the invention to provide a detachable coupling in which metal-to-metal sealing contact between the parts may be established with a relatively low contact pressure, and hence a relatively low turning torque on thereaded members for bringing about the sealing contact.

Another object is to provide a coupling which is particularly effective for maintaining a seal while the joint is subject to vibration.

Another object is to provide a coupling in which the mating parts readily seat against each other in full sealing contact despite angular misalignment of their longitudinal axes.

Another object is to provide a self restoring or spring action in one of the coupling elements for automatically compensating for minute separation of the contacting sealing surfaces due to vibration or other strains and which would otherwise cause leakage.

It is another object to provide a coupling in which the fluid being sealed assists in maintaining the seal between the coupling parts.

Another object is to provide a sleeve for a coupling wherein the sleeve has a flexible lip for sealing against a fitting body, and in which the sleeve has a cylindrical bore behind said lip into which a tube may be brazed.

It is another object to provide a coupling of the type described in which the sleeve has a forwardly facing shoulder engageable by an opposed extension in the coupling body for limiting the extent that the flexible lip may be deformed when brought into sealing contact with the body.

It is another object to provide a coupling of the type described with a ratchet locking device for positively locking the nut and body against loosening.

Other objects will be apparent from the following description and from the drawing in which:

FIGURE 1 is a cross section showing the parts in assembled and sealing relation, and FIGURE 2 is a fragmentary cross sectional view of the coupling sleeve, one end being shown in semi-finished form by solid lines and in finished form by dotted lines.

FIGURE 3 is an end view of the ratchet plunger.

FIGURE 4 is a fragmentary side view of the ratchet locking device.

FIGURE 5 is a fragmentary end view of the ratchet locking device.

FIGURE 6 is a fragmentary section view illustrating the flexing of the sealing lip during makeup of the joint.

The coupling comprises a body 10 having a bore 11 for the passage of fluid therethrough. The body may, of course, be of various shapes, such as a straight connector or union, an elbow, a T, etc. In the embodiment shown, the body is a straight connector and has a tubular socket 12 for receiving a tube 13 which is brazed therein.

The other end of the body 10 has an external thread 14 and a frusto-conical countersink, or tapered seat, 15 leading to the bore 11. In one preferred embodiment of the invention the tapered seat 15 has an included angle of approximately 60°.

A tube or pipe 18 has brazed or welded thereto a sleeve 19 which has a cylindrical skirt 20, a solid, relatively unyieldable enlarged head portion 21 of substantial length whose rear face 23 constitutes a shoulder for engagement by an internal flange 24 of an internally threaded nut 25, and a forwardly extending flexible lip 28.

The sleeve 19 is preferably initially formed as shown in FIGURE 2 with a cylindrical bore 26 for closely fitting over the tube 18, and with the lip 28 in cylindrical form as shown in solid outline. After such initial forming, the flexible lip is swaged or rolled into a frusto spherical shape as shown by the dotted lines in FIGURE 2.

In its final frusto spherical shape, the flexible lip 28 is dimensioned so that it will make initial line contact, as at 31, with the tapered seat 15 at a distance from the free or outer end of lip which is about one fourth the length of the lip and preferably no more than one half such length. This close spacing of the contact line from the lip end is to assure enough deflection of the lip to obtain sufficient spring action with relatively light contact pressure between the lip and seat, as when light wrench torques are applied to the nut. Thus for example, on a coupling for 1″ O.D. tube the lip 28 may have a thickness of .031″, a developed length of .220″, and with the initial contact line 31 spaced .080″ from the free end of the lip 28.

The solid section 21 of the sleeve is of substantial length at least as long as the lip 28 and at least twice the thickness thereof so as to provide a rigid base for the lip and also to provide a rigid stop means for contact with the end of the body. Stainless steel is a preferred material for such sleeve and the head is preferably at least three times as long as its thickness.

The bore 26 through the sleeve is preferably of the same diameter throughout (except for the inwardly turned lip 28), such diameter being just slightly larger than the outer diameter of the tube 18. The smallest inside diameter of the lip 28 and the bore 11 of body 10 are substantially the same as the inside diameter of the tube 18 so as to permit unrestricted passage of fluid therethrough.

Outwardly of the tapered seat 15 the body has a relatively short extension 27 having a cylindrical bore 29. This extension 27 is adapted to contact a forwardly facing shoulder 30 on the sleeve for limiting the extent to which the flexible lip 28 may be deformed when brought into sealing engagement with the tapered seat 15.

To assemble the coupling, the nut 25 and sleeve 19 are slipped onto the tube 18 and the sleeve 19 is brazed or welded to the tube. The braze metal is applied at the tube end near the lip 28 and flows rearwardly between the tube and sleeve. A series of inspection holes 22 are provided about midway of the length of the skirt portion. When the braze metal is observed to have reached the holes 22, sufficient brazing is assured. After the parts are so brazed, the sleeve 19 is brought into position against the body 10 and the nut 25 threaded onto the latter.

Because of the spherical configuration of the lip 28, it makes a complete circular line contact 31 with the tapered seat 15 even though the longitudinal axis of the sleeve 19 is in slight angular misalignment with the longitudinal axis of the seat 15. The flexibility of the lip 28, in conjunction with its spherical configuration, permits the lip to readily yield to compensate for slight machining and alignment inaccuracies for establishing full circular line sealing contact with the seat 15 with relatively slight pressure between the parts. Thus only a relatively low wrench torque on the nut 15 is required for establishing sealing contact. In fact, a seal is readily obtained by finger tightening of the nut.

In establishing the line contact seal at 31, the lip 28 will deflect radially inwardly, as shown in FIGURE 6 and set up a self restoring or spring action so that in the event strains from vibration or other causes tend to separate the lip from the seat 15, there is a self restoring action which keeps the lip in constant contact with the seat and thus prevents leakage. This is an important feature of the invention and is brought about by the fact that the initial contact line 31 is located relatively near the free end of the lip 28. In FIGURE 6 the dotted line shows the position of the lip 28 when it has just contacted the seat 15. The solid line indicates the position to which the lip is deflected when the nut is tightened.

In addition, fluid pressure acts within the sleeve bore on the entire area of the inner side of the lip tending to expand the same. At the same time, only the relatively small portion of the lip outer surface between the end 30 and the contact line 29 is subject to fluid pressure tending to contract the lip. The result is a substantial differential of pressure tending to expand the lip and thus aiding in maintaining the lip in sealing contact with the tapered seat 15.

In addition, the circular line of contact at 31 is initially on a diameter less than the inner diameter of the sleeve lip adjacent the head and remains at a lesser diameter in the final assembled position of the parts. This results in a couple action which additionally facilitates flexing of the lip for spring loading the same so that it constantly tends to expand and thus assures a tight seal even at low fluid pressures.

Also it will be observed that the line of contact 31 is on a diameter no larger than the diameter of bore 26 of the sleeve in which tube 18 is received. In fact, the diameter of contact line 31 is smaller than such bore diameter. As a result, the sleeve has no effective area subject to pressure of fluid within the tube or coupling which will result in a force being applied to the sleeve tending to force it axially away from body 10. This is an important feature in couplings for high pressures as otherwise the nut, sleeve, and body must be made stronger, and hence larger and heavier, to hold the coupling parts together. In the present invention with contact line 31 smaller in diameter than sleeve bore 26, the difference in such diameters provides an effective area which when subjected to pressure of fluid within the coupling results in a force being applied to the sleeve tending to move it axially toward, rather than away from, body 10. This helps to minimize the size and weight of the coupling parts.

The body 10 is provided with a bore 35 and counterbore 36 for receiving a plunger 37. The latter has a cylindrical collar 38 receivable in the counterbore 36 and is retained in the bore 35 by a sleeve 39 press fitted onto the plunger. The forward end of the plunger has a tongue 40 of substantially rectangular cross section. A spring 41 between the collar 38 and counterbore bottom normally keeps the tongue 40 in extended position with sleeve 39 in engagement with body 10 as shown to limit the distance to which tongue 40 may extend toward nut 25.

The nut 25 has a counterbore 45 at its forward end providing a forwardly projecting annular rim 46. The latter has a series of ratchet teeth 47, each having an inclined face 48 and a right angle face 49.

As the nut is threaded onto the body 10, the inclined faces 48 of the teeth 47 will engage the tongue 40 and move the latter back against the action of the spring until the tongue has passed over the end surface 50 of the particular tooth 47. The tongue 40, under the action of this spring 41, then snaps forward into the next tooth space.

Inadvertent reverse threading, or loosening, of the nut is prevented by contact of the tongue 40 with the right angle face 49 of the engaged tooth. When it is desired to uncouple the parts, the plunger sleeve 39 is gripped by the operator and the plunger retracted against the spring 41 until the tongue 40 is withdrawn from between the teeth 47. The plunger is then rotated 90° to the position shown in FIGURE 5 in which it engages the tooth end surfaces 50 and is thus prevented from entering the tooth spaces. The nut may then be unthreaded.

The above description is of one embodiment of the invention. It is obvious that various modifications, such as substitution of means other than a threaded nut and body for joining the parts, as well as other modifications, may be made without departing from the true scope of the invention as defined by the following claims.

We claim:

1. A coupling for tubes comprising a body having an internal frusto-conical seat leading to a bore therethrough, a sleeve having a bore therein for receiving a tube, said tube being sealingly attached to said sleeve within said bore, said sleeve having a relatively thick annular head the ends of which provide first and second shoulders, a relatively thin resiliently deformable annular lip extending from said head at a location radially inward of said first shoulder and having a bore therethrough, said lip having an outer convexly curved outer face tangent to and in annular sealing contact with said frusto-conical seat at a diameter greater than that of the free end of the lip, a member having an abutment shoulder in engagement with said second shoulder and interengaged with said body for applying clamping pressure to said sleeve for holding said lip against said seat, said lip being flexed radially inward by said seat and constantly tending to expand for maintaining said sealing contact, said first shoulder being engageable with said body to limit the extent to which said lip may be inwardly flexed by said seat, said sleeve having an internal annular recess between the end of the tube and the free end of said lip, said annular sealing contact when said lip is flexed inward being on a diameter no greater than the maximum diameter of such recess whereby the force of fluid pressure within said coupling is ineffective for exerting force upon said lip tending to axially separate the latter from said body.

2. A coupling in accordance with claim 1 in which said annular sealing contact is on a diameter less than the maximum diameter of such recess whereby said sleeve has an effective annular area which, when subjected to pressure of fluid within said coupling, results in a force on said lip tending to move the same axially toward said body.

3. A coupling in accordance with claim 1 in which the bore through said lip is at all times in unrestricted communication with the interior of said tube whereby it is at all times subject to full pressure of fluid within said tube, said lip being sufficiently resilient to permit the pressure of said fluid to urge said lip radially outward into tighter sealing engagement with said seat.

References Cited in the file of this patent

UNITED STATES PATENTS

| | | |
|---|---|---|
| 887,864 | Steese | May 19, 1908 |
| 966,870 | Stoddard | Aug. 9, 1910 |
| 1,253,065 | Looze | Jan. 8, 1918 |
| 1,363,181 | Hemger | Dec. 21, 1920 |
| 1,915,552 | Shimdel | June 27, 1933 |
| 1,933,915 | Lindquist | Nov. 7, 1933 |
| 2,031,878 | Coutu | Feb. 25, 1936 |
| 2,148,746 | Hampe | Feb. 28, 1939 |
| 2,330,864 | Bruno | Oct. 5, 1943 |
| 2,746,486 | Gratzmuller | May 22, 1956 |
| 2,766,999 | Watts | Oct. 16, 1956 |
| 2,774,618 | Alderson | Dec. 18, 1956 |

UNITED STATES PATENT OFFICE
Certificate

Patent No. 3,069,187                                  Patented December 18, 1962

Donald F. Collins and Donald E. Emmons

Application having been made jointly by Donald F. Collins and Donald E. Emmons, the inventors named in the above identified patent; Parker-Hannifin Corporation, Cleveland, Ohio, a corporation of Ohio, the assignee of record, and Robert J. Dawson and his designated assignee, North American Aviation, Inc., for the issuance of a certificate under the provisions of Title 35, Section 256 of the United States Code, adding the name of the said Robert J. Dawson as a joint inventor, and a showing and proof of facts satisfying the requirements of the said section having been submitted, it is this 22nd day of February 1966, certified that the name of the said Robert J. Dawson is hereby added to the said patent as a joint inventor with the said inventors named in the patent.

[SEAL]

EDWIN L. REYNOLDS,
*First Assistant Commissioner of Patents.*